Nov. 15, 1966 W. J. HYNEK 3,284,857
APPARATUS FOR PRODUCING APERTURED NON-WOVEN FABRICS
Original Filed March 2, 1961 7 Sheets-Sheet 1

INVENTOR.
WALTER J. HYNEK
BY Arnold J. Worfolk
ATTORNEY

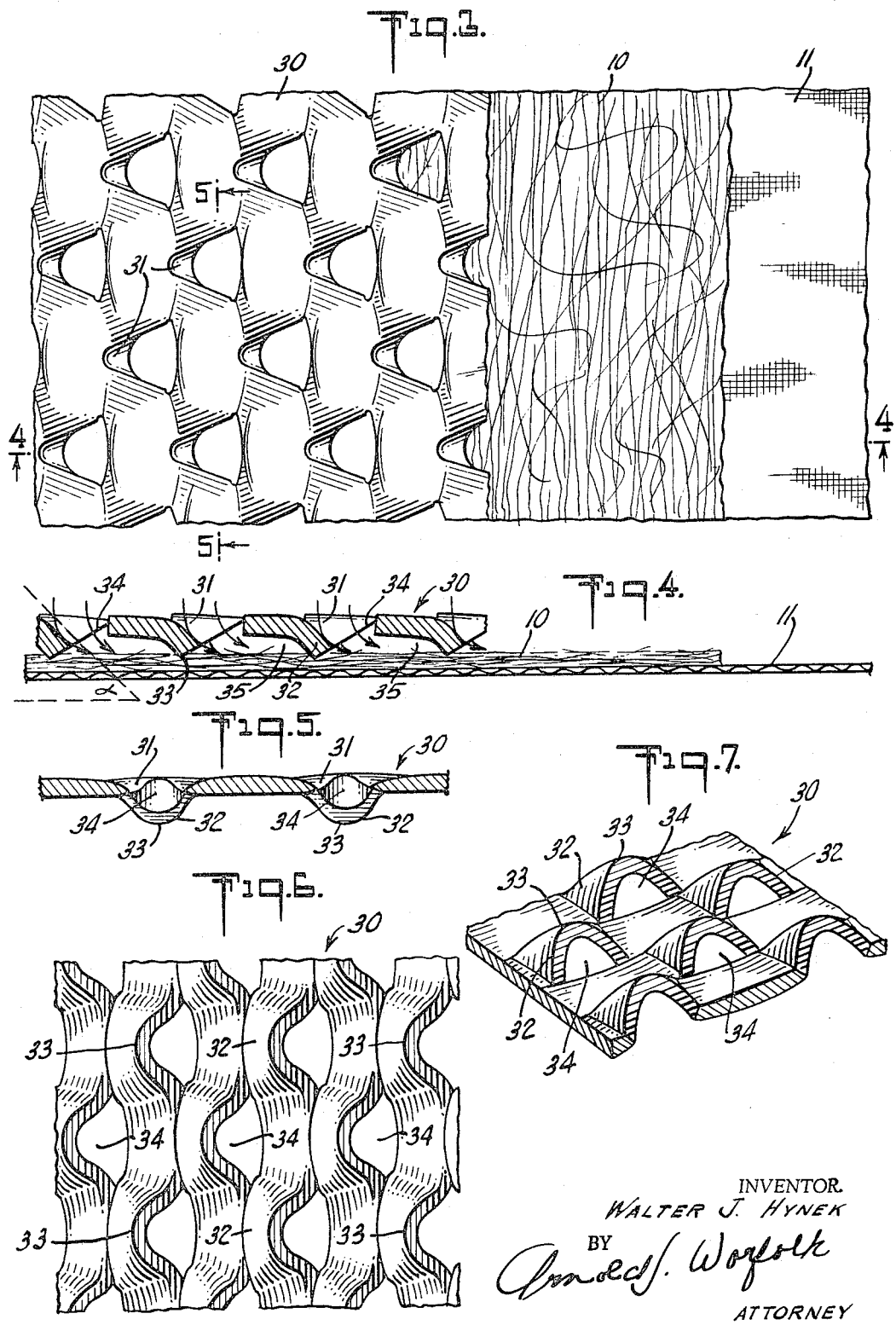

INVENTOR
WALTER J. HYNEK
BY
Arnold S. Worfolk
ATTORNEY

Nov. 15, 1966 W. J. HYNEK 3,284,857
APPARATUS FOR PRODUCING APERTURED NON-WOVEN FABRICS
Original Filed March 2, 1961 7 Sheets-Sheet 5

INVENTOR
WALTER J. HYNEK
BY
ATTORNEY

INVENTOR
WALTER J. HYNEK
BY Arnold J. Worfolk
ATTORNEY

_United States Patent Office_  
3,284,857  
Patented Nov. 15, 1966

3,284,857  
APPARATUS FOR PRODUCING APERTURED NON-WOVEN FABRICS  
Walter J. Hynek, East Brunswick, N.J., assignor, by mesne assignments, to Johnson & Johnson, New Brunswick, N.J., a corporation of New Jersey  
Original application Mar. 2, 1961, Ser. No. 92,986. Divided and this application Jan. 7, 1965, Ser. No. 434,158  
3 Claims. (Cl. 19—161)

This application is a division of my copending application S.N 92,986, filed March 2, 1961, now Patent No. 3,240,657.

This invention relates to a new process and apparatus for rearranging the fibers of a web whose individual fibers are capable of relative movement under the influence of applied fluid forces to produce a tuberculated foraminous fabric. The invention also relates to the product that results from practicing the improved process and using the improved apparatus.

One method of practicing the invention contemplates rearranging fibers in a layer of fibrous material as, for example, a web of rayon or cotton textile type fibers, into a nonwoven fabric structure having a pattern of tubercles and holes disposed uniformly over the surface of the fabric, the tubercles being interconnected by fabric portions of lesser thickness than the tubercles. The tubercles and the tubercle interconnecting portions are made up of groups of consolidated fiber segments, i.e., fractional lengths of fibers, or when short fibers are used, the fibers themselves compacted to a substantially greater degree than in the original starting fiber webs, and with the interconnecting fabric portions varying in thickness from a maximum where they merge into the tubercles to a minimum adjacent the holes.

The fibers in the tubercles and the tubercle interconnecting portions forming the foraminous structure, are in a relatively unstressed condition and lie in a state of mechanical equilibrium. The fibers are mechanically engaged, both frictionally and by interlocking or entanglement of the fibers, to the extent that the arrangement of fibers is one of equilibrium and the fibers themselves have substantially no inbuilt tendency to depart from their configurations or locations in the structure. The fabric even in the absence of bonding maintains its integrity by the mechanical engagement of the fibers as just stated, and this maintenance of integrity, at least insofar as concerns webs employing the longer fibers, is materially enhanced by the fact that the longer individual fibers have their fiber segments extending in different directions facewise of the fabric and located in different tubercles and tubercle interconnecting portions thereby to connect various tubercles and tubercle interconnecting portions together. Interconnecting fibers which have fiber segments common to a given tubercle or tubercle interconnecting portion may have other of its fiber segments located in different tubercles or tubercle interconnecting portions, thus to form a unitary foraminous fabric presenting a substantially uniform tuberculated surface throughout its area.

Increased strength may be imparted to the fabric as by printing or impregnation with an adhesive bonding material or binder.

The improved fabric has a three dimensional effect and greater bulk as compared with other nonwoven fabrics made from fiber webs of the same weight and whose thicknesses are substantially uniform. It may be characterized as having a predetermined pattern of fabric areas in each of which there is a plurality of area portions of different fiber concentrations but of substantially the same fiber density. The area portions of greater fiber concentration are thicker than the area portions of lesser concentration. The thicker area portions in the different fabric areas are spaced apart each from the other but are connected together to form the unitary fabric structure by the thinner area portions.

The fabric's tuberculated surface gives it a better scrubbing and wiping action than would the relatively smooth surfaces of other typical nonwoven fabrics. The improvement fabric is of substantial advantage in surgical applications demanding absorbility but nonadherence. More or less point contact with an open wound, as permitted by the tuberculated surface, will present the necessary absorbing sites at the tubercles' extremities but little fabric surface for contact with the wound.

The improved product may be prepared by introducing a fibrous web produced from fibers by carding, garnetting, deposition by air laying or paper making procedures, and like techniques, and whose individual fibers are capable of relative movement within the web, into a fiber rearranging zone wherein the web while supported adjacent one of its faces by a fluid pervious member, is confined adjacent the other of its faces by a forming plate whose surface closest the web presents a pattern of protuberances. The ends of such protuberances preferably are all located in a common plane space somewhat from the surface of the plate from which they project. Sometimes hereinafter this plane is referred to as the "reference plane." A passageway is formed in each protuberance through which liquid or other fluid, preferably water, is introduced into the rearranging zone. The design of the passageway is such that the fluid, assuming appropriate velocity, funnels into the rearranging zone at an acute angle with respect to the web as it is supported in the zone and with such of its force components as are parallel with the web acting predominantly in one direction. The entering fluid stream washes aside substantially all the fibers in its path so as to make a hole clear through to the web support, and because of the predominantly unidirectional nature of the components of force parallel to the web, such resistance as is offered to the movement of fibers in the web, in that direction is efficiently overcome. As a result, adjacent streams acting in like manner upon the web, produce therein a pattern of the holes as determined by the pattern of holes in the forming plate.

Indeed, the streams of fluid entering the rearranging zone conceivably could wash aside the fibers in the web to the point of destroying its integrity were it not for the facts, firstly, that the web is held against the protuberance by its pervious support thus to anchor the web in position relatively to the plate, and secondly, that fiber segments in the path of the streams are washed up against the next protuberance in the line of flow, thus to limit movement of the fiber segments and pile them up into mounds of fiber segments extending upwardly beyond the plane of reference and whose upper surface contours are determined for the most part by the underside contour of the adjacent forming plate which thus acts like a mold.

The rearranging fluid ultimately drains from the rearranging zone through the fluid pervious web support. In passing through the rearranging zone, some of the rearranging fluid, after piling up fiber segments against a protuberance, may diverge around the protuberance thence to converge "downstream" with portions of other fluid streams. For the most part, however, the fluid, having performed its rearranging function, passes on through the pervious web support. From this cooperation of, forming plate, fluid pervious support, and fluid velocity and flow, there results a fabric having tubercles raised above the reference plane on the "upstream" side of the protuberances, holes in the fabric on the downstream side of the protuberances where the fabric is depressed below the reference plane, and a gradual diminution in the thickness of the fabric between the upstream side of the protuberance where the fabric's thickness is greatest, and the downstream side of the protuberance where the fabric thins off gradually toward the edge of the hole.

Except for the character of the rearranging zone defining means responsible for molding the fabric into one with a tuberculated surface, appropriate apparatus for practicing the invention may be similar in most respects to that disclosed in U.S. Patent 2,862,251 to F. Kalwaites, entitled, "Method and Apparatus for Producing Non-Woven Product."

A better understanding of the invention may be had from the following description read in conjunction with the accompanying drawings, wherein:

FIG. 3 is an enlarged diagrammatic view of a "sandwich" comprising a forming plate suitable for practicing the invention, partially broken away to expose an intermediate web to be rearranged and which in turn is partially broken away to expose the underlying web supporting member, the "sandwich" being shown from the side thereof against which impinges the rearranging fluid;

FIG. 4 is a sectional view on line 4—4 of FIG. 3;

FIG. 5 is a partial sectional view on line 5—5 of FIG. 3, but only through the forming plate;

FIG. 6 is a bottom view of a portion of the forming plate shown in FIG. 3, i.e., the side opposite that against which impinges the rearranging fluid;

FIG. 7 is a perspective view of a portion of the forming plate of FIG. 6 and also looking at the bottom;

FIG. 16 is a photograph of a section taken through a tubercle and an adjacent tubercle interconnecting portion and exemplifying the fiber density therein, the magnification being about 40×.

Figure 1:
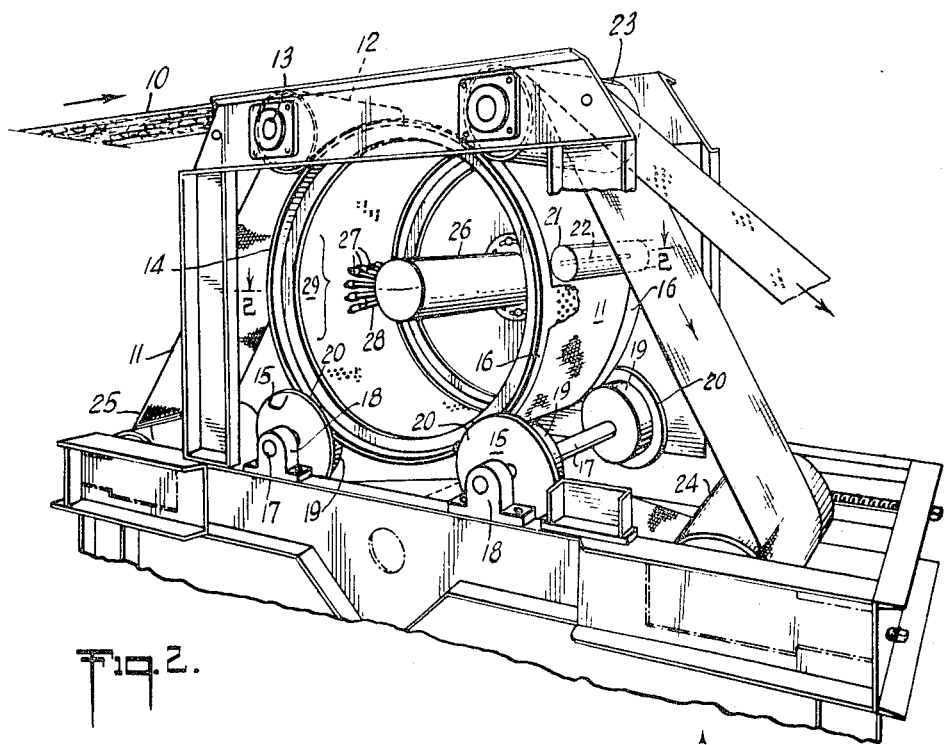
FIG. 1 is a perspective view of one type of machine that may be used in practicing the invention.
Figure 2:
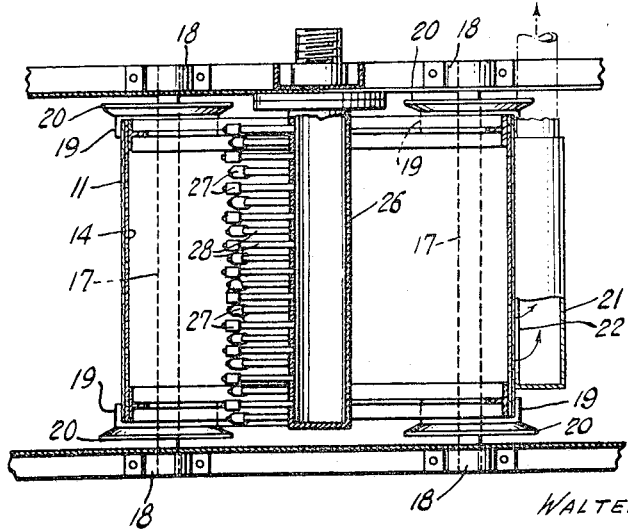
FIG. 2 is a partial horizontal sectional view on line 2—2 of FIG. 1.

The starting layer of material or base web may comprise natural fibers, such as cotton, flax, wood, silk, wool, jute, asbestos, ramie, "rag," or abaca; mineral fibers such as glass; artificial fibers such as viscose rayon, cupra-ammonium rayon, ethyl cellulose or cellulose acetate; synthetic fibers such as polyamides, i.e., nylon, polyesters, i.e., "Dacron," acrylics, i.e., "Orlon," "Acrilan" and "Dynel," polyethylene, vinylidene chloride, i.e., saran, polyvinyl chloride, polyurethane, etc., alone or in combination with one another. While relatively long textile-type fibers above normal papermaking lengths and close to normal textile length, say of about ¼ inch to 2 inches or longer, are preferred for textile applications, shorter fibers, below ¼ inch in length, such as cotton linters, and woodpulp fibers within the papermaking range, may be used for these and other applications. Preferably, however, the shorter papermaking fibers should be unbeaten or substantially unhydrated if a textile-like fabric is desired as the end product. In this connection, shorter hydrated woodpulp fibers of papermaking length, for instance, may be mixed with longer fibers in such a way that the longer fibers will contribute the strength desired in the resulting fabric while the shorter woodpulp fibers will decrease the cost.

Satisfactory rearranged webs may be produced according to this invention from fibrous starting webs of textile fibers weighing between about 100 grains/sq. yd., or slightly lower, and about 2700 grains/sq. yd. or slightly higher. Using free hydrated woodpulp fibers ⅛ inch to less than ¹⁄₁₆ inch in length, webs of up to 4000 grains/sq. yd. or even higher may be formed.

A web 10 or layer of mechanically engaged fibers, in a state of balanced equilibrium, such as may be formed by carding, garnetting, air laying by techniques such as are disclosed in U.S. Patent 2,676,364, papermaking techniques, etc., is led from a suitable source not shown and deposited on a flexible conveying belt support 11 just about where the belt passes over a horizontal guide roller 12 fixed on a shaft 13 which is journaled for rotation at its opposite ends in the side frame members of the machine. The web, as it is carried by the belt support passes around the guide roller 12 and then is sandwiched between the belt and a relatively large cylindrical drum 14 around which the belt passes and whose axis is parallel with the axis of the guide roller and which is cradled for rotation about its own axis on two pairs of spaced flanged discs 15 disposed near the bottom of the drum. The cylindrical drum 14 is longer in an axial direction than the width of the web supporting belt 11 so that there is a cylindrical marginal portion 16 at each end of the drum that remains uncovered by the web supporting belt in its travel around the drum. The discs 15 of each pair are fixed near the opposite ends of a shaft 17, disposed parallel with the drum's axis, and which is journaled at its ends in bearings 18 fixed on the machine frame. These discs present cylindrical portions 19 to accommodate the marginal end portions of the drum and radial disposed flanges 20 which overlap the opposed peripheral edges of the drum, so as to prevent movement of the drum in an axial direction laterally of the machine. The spacing between the shafts 17 of the respective pairs of discs in a direction fore and aft of the machine (i.e., the direction of web travel) is sufficient to cradle the drum with appropriate stability during its rotation.

As the drum 14 rotates through the drive of the belt 11, as will be later explained, the drum and belt with web 10 sandwiched therebetween travels as a unit without relative movement through a drum rotation of about 315 degrees, i.e., from the initial guide roller 12 that first receives the web, down and around the drum and up to a position angularly spaced about 45 degrees from the initial guide roller where the belt and web supported thereon are taken off the drum. The web, during this travel, passes through a fiber rearranging zone, described in greater detail later on, where it is subjected to the action of the rearranging fluid. If the fluid used is water, the web after fiber rearrangement has a substantial amount of its entrained moisture removed by passing in close proximity to a dewatering device which may be in the form of a chamber 21 connected to a source of vacuum not shown and provided with a longitudinal slot 22 extending from one edge of the supporting belt to the other and in axial parallelism with the drum. Such a device may serve to diminish web moisture to about 150 percent in a web containing 1200 percent, thereby greatly facilitating the removal of the web from the drum. At the take-off position, the web and supporting belt pass between the drum 14 and another guide roller 23 fixed on a shaft journaled in bearings in the side frame members of the machine and which is in axial parallelism with the drum. The supporting belt with web then leaves the surface of the drum and pass around and above the guide roller 23 and then downwardly.

The supporting belt 11, after its divorce from the web 10, travels downwardly and around two guide rollers 24, 25, both axially parallel with the drum axis and which are located one near the rear and the other near the front of the machine. From the latter roller, the supporting belt 11 travels up to the initial guide roller 12, ready again to support and carry a new section of the fiber web 10 through the machine and render the process continuous. The drive of the drum, incidentally, is through the belt support 11 which in turn may be driven from the guide roller 24. Roller 24 for this purpose may be suitably connected with a motor, not shown.

Of the same axial length as the drum and fixed coaxially within it is a manifold 26, closed at one end but provided at the other end with appropriate fittings through which a rearranging fluid, such as water, may be introduced under pressure. Fluid, preferably in the form of streams of liquid droplets, is projected toward the inner surface of the cylindrical drum 14 from appropriate conventional nozzles 27 disposed at the ends of tubes 28 which communicate with the manifold and extend radially therefrom. The tubes 28 are arranged in banks extending along the manifold 26. Two such banks at least are preferred, and sometimes three, four or even more may be desirable to increase speed of operation. However, as will be observed, the nozzle-ended tubes are all directed generally in the same direction so as to encompass within their range of action, a relatively minor portion 29 only of the interior circumferential surface of the drum.

The belt support 11 is pervious to fluid, e.g., water, and is foraminous, possessing openings varying from about 900 openings per square inch to about 50,000 openings per square inch or more, preferably from about 10,000 to 40,000 openings per square inch. The smoothness or evenness of the backing means or screen affects the production of the rearranged fabric, the finer screens tending to possess greater smoothness and thereby more readily to facilitate motion of the fibers along its surface.

The foraminous backing means may be made of any suitable material. A screen belt in woven form gives excellent results. However, a woven belt is not essential since the belt may have the openings punched or etched in the material. The belt, in screen form, may be made of stainless steel, bronze, copper, alloy, nylon, synthetic resinous fibrous materials such as fibers sold by the E. I. du Pont Co., under the trademark "Orlon," or the like. It can be in the form of a flexible punched plate of steel, plastic or other material which is sufficiently foraminous to allow passage of the fluid but sufficiently impervious and smooth to permit the action of the fluid to effect the desired rearrangement of the fibers over its surface without washing them away.

Suitable devices, of no concern with this invention, may be used to adjust the tension in the supporting belt 11 and its location laterally with respect to the guide rolls and drum.

Except for specific details which will be evident from which has been said, the apparatus used in practicing the invention, as thus far described, is old, and reference may be had to Kalwaites 2,862,251 supra if greater details of construction are desired.

In accordance with the present invention, the cylindrical wall of the drum comprises an apertured plate 30 of unique construction (FIGS. 3, 4, 5, 6 and 7). Passageways 31 therein are disposed over the cylindrical surface of the drum in a pattern corresponding to the desired pattern of holes in the finished fabric. The surface of the plate opposite the surface against which impinges the liquid ejected from the nozzles 27, is formed with a series of protuberances 32, one for each passageway 31, preferably all of the same size, and having their outermost ends 33 all in a common plane. The passageways 31 in the surface of the plate against which impinges the liquid ejected from the nozzles, taper from relatively larger cross-sectional area at such surface to relatively smaller cross-sectional area, where an opening or aperture 34 is presented through one wall of the proturberance at a position just above or inwardly from the outermost end thereof.

Each passageway 31 as just described constitutes a tapering passageway through the plate permitting passage of liquid therethrough. The tapering passageway has one surface portion thereof preferably inclined at an angle $\alpha$ to the reference plane defined by the ends of the protuberances 32, and since the opening at the end of the passageway is in a side wall of the protuberance it, too, is inclined at an angle with respect to the reference plane. According to this construction, liquid striking the plate on that face thereof presenting the larger ends of the passageways 31 is deflected by the inclined surfaces thereof and is caused to funnel through the passageways with increasing velocity as it approaches the narrower ends of the passageways. The liquid leaves the passageways in streams all having substantial components of velocity in one direction along the reference plane and with no stream having any substantial component of velocity in a direction in opposition to a component of velocity in an adjacent stream.

After the web 10 to be rearranged has been sandwiched between the supporting belt 11 and the drum 14 of a machine equipped with an improved plate 30 as above described, the sandwich as a unit travels past the bank of nozzles 27 from which fluid, preferably liquid, is projected against the surface of the plate with a velocity determined in part by the pressure head in the manifold common to the nozzles. A manifold pressure of 80 p.s.i. has proved adequate and appropriate for fiber rearrangement in equipment of this type.

The foraminous supporting belt 11 in the sandwich, by appropriate tensioning, is urged with substantial pressure towards the ends 33 of the protuberances 32 in the plate and, indeed, would rest during the fiber rearranging operation tightly against them were it not for the interposition of the fiber web 10 to be rearranged (FIGS. 3, 4). But even with the web held tightly against the protuberances, it will be observed that there are pockets or intaglios 35 of substantial volume beneath the plate, free of fibers and hence capable of accommodating fibers or fiber segments.

Figure 8:
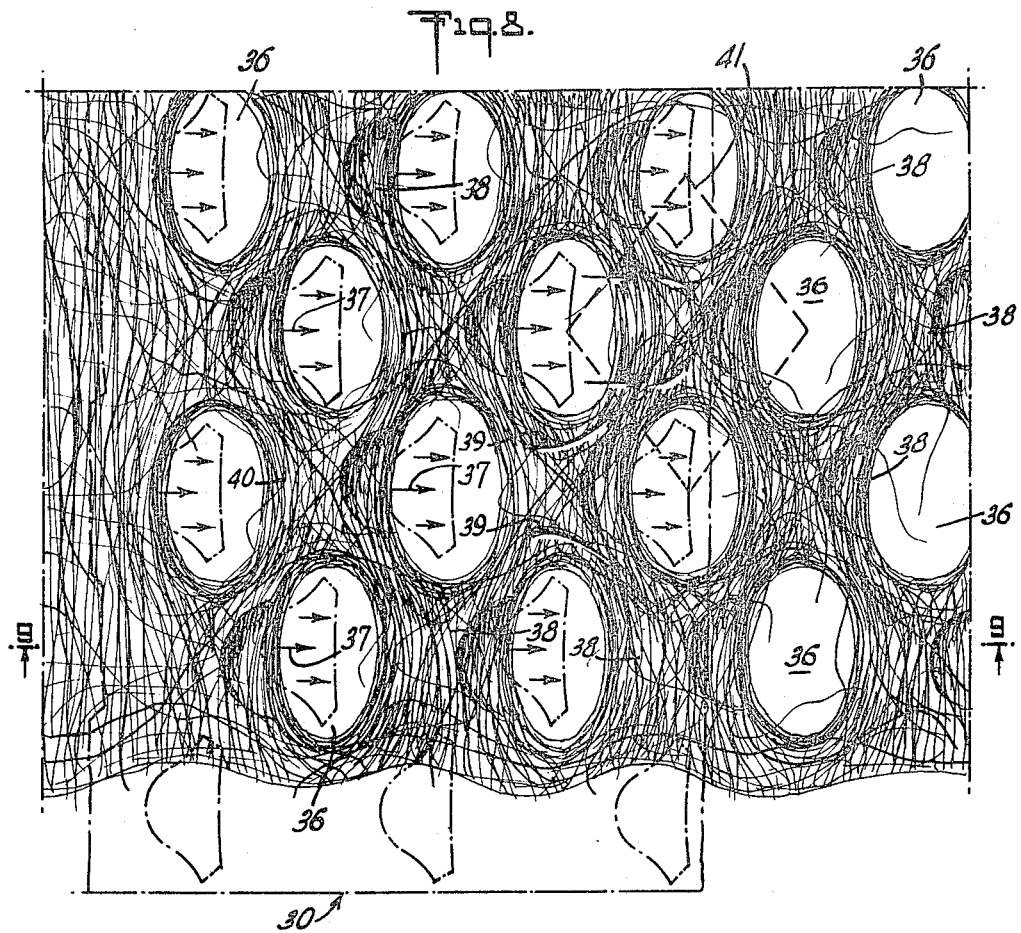
FIG. 8 is a plan view of an enlarged portion of a nonwoven fabric still in the "sandwich" but after fiber rearrangement, and with the outlet holes of the forming plate shown in phantom lines to illustrate their positional arrangement with respect to the various parts of the fabric after fiber rearrangement.
Figure 9:
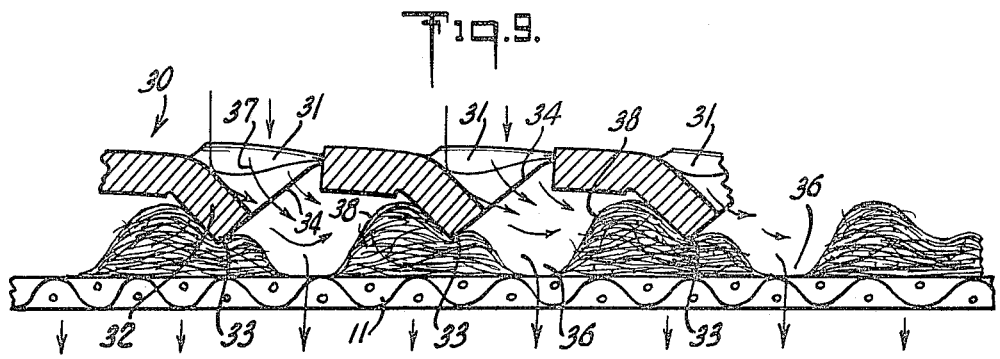
FIG. 9 is a sectional view on line 9—9 of FIG. 8, but with the forming plate and the pervious web support included.

As any portion of the web 10 is caused to traverse the region affected by liquid sprayed from the nozzles 27, liquid streams passing through holes 34 in the forming plate 30 impinge upon the fibers of the web 10 lying within their path. The action of the individual streams is to wash aside the fiber segments within its path down below the reference plane (defined by the ends of the protuberances) and until the supporting belt 11 in the line of the streams is substantially devoid of fibers or fiber segments (FIGS. 8 and 9). The places substantially devoid of fibers are the holes 36.

The washing aside or displacement of fiber segments in any given web is facilitated by the funneling action of the tapering passageways 31 as the liquid passes through the plate 30 and which increases the velocity of flow, the directional nature of the fluid forces acting upon the fibers as a result of the angular disposition of the funneling passageways (note the directional arrows 37, FIGS. 8 and 9), the smoothness of the belt's surface on which the web 10 is supported, and the ability of the belt support by virtue of its perviousness to permit egress of water from the zone in which the fibers are rearranged. In this last connection, it should be borne in mind that the fluid in the rearranging zone should not be allowed a volume build-up to a point where flow of the liquid results only from a pressure head. This volume must be kept down, as by appropriately selecting screen fineness to enable the energy in the fluid entering the rearranging zone, as a result of its velocity, to be most effectively used.

The fiber segments washed aside or displaced from the path of the streams of fluid entering the rearranging zone through any given hole 34 are moved along the belt support "downstream," i.e., in the direction of flow resulting from the angular disposition of the passageways, until they are impeded by the protuberance 32 next in the line of flow.

The fiber segments located directly beneath the protuberances 32 are anchored in position by pressure of the supporting belt 11 holding such fiber segments firmly against the ends of the protuberances but the fiber segments which are permitted to move and whose progress is impeded by the protuberances are washed or heaped up in a mound in advance of the protuberances, to form tubercles 38 whose crests rise above the reference plane (FIGS. 8, 9). The tubercles at the top have a contour determined in part by the adjacent walls of the protuberances against which the fibers are washed and also by the overlying ceiling of the plate cavities 35 adjacent to and in advance of the protuberances and which may be considered intaglio recesses. In this connection, of course, the volume of fiber segments in the web should be such as to fill up a portion at least of the cavities.

Figure 10:
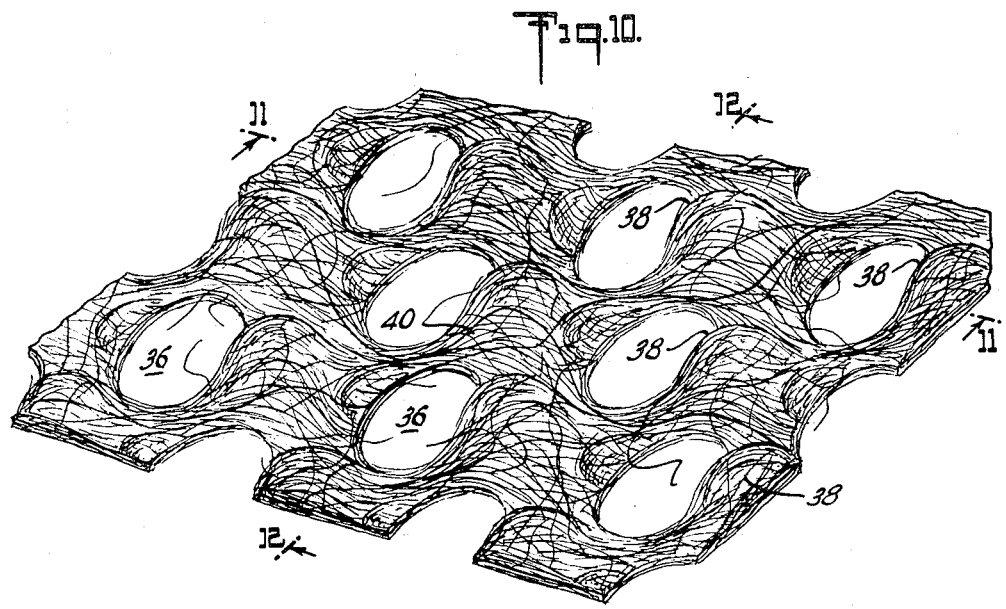
FIG. 10 is a perspective view greatly enlarged of a tuberculated fabric embodying the present invention.
Figure 11:
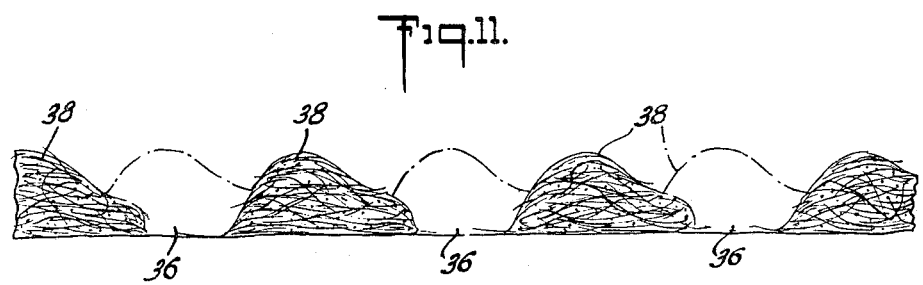
FIG. 11 is a sectional view on line 11—11 of FIG. 10.
Figure 12:
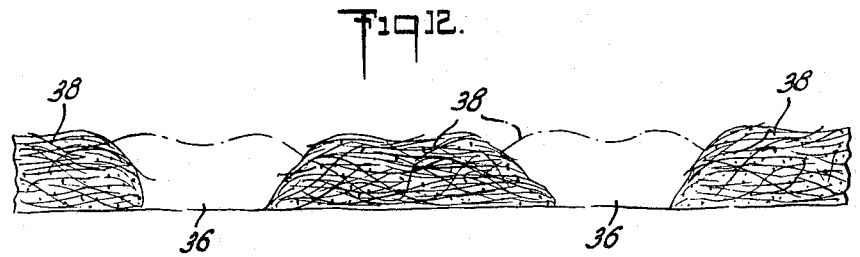
FIG. 12 is a sectional view on line 12—12 of FIG. 10.
Figure 13:
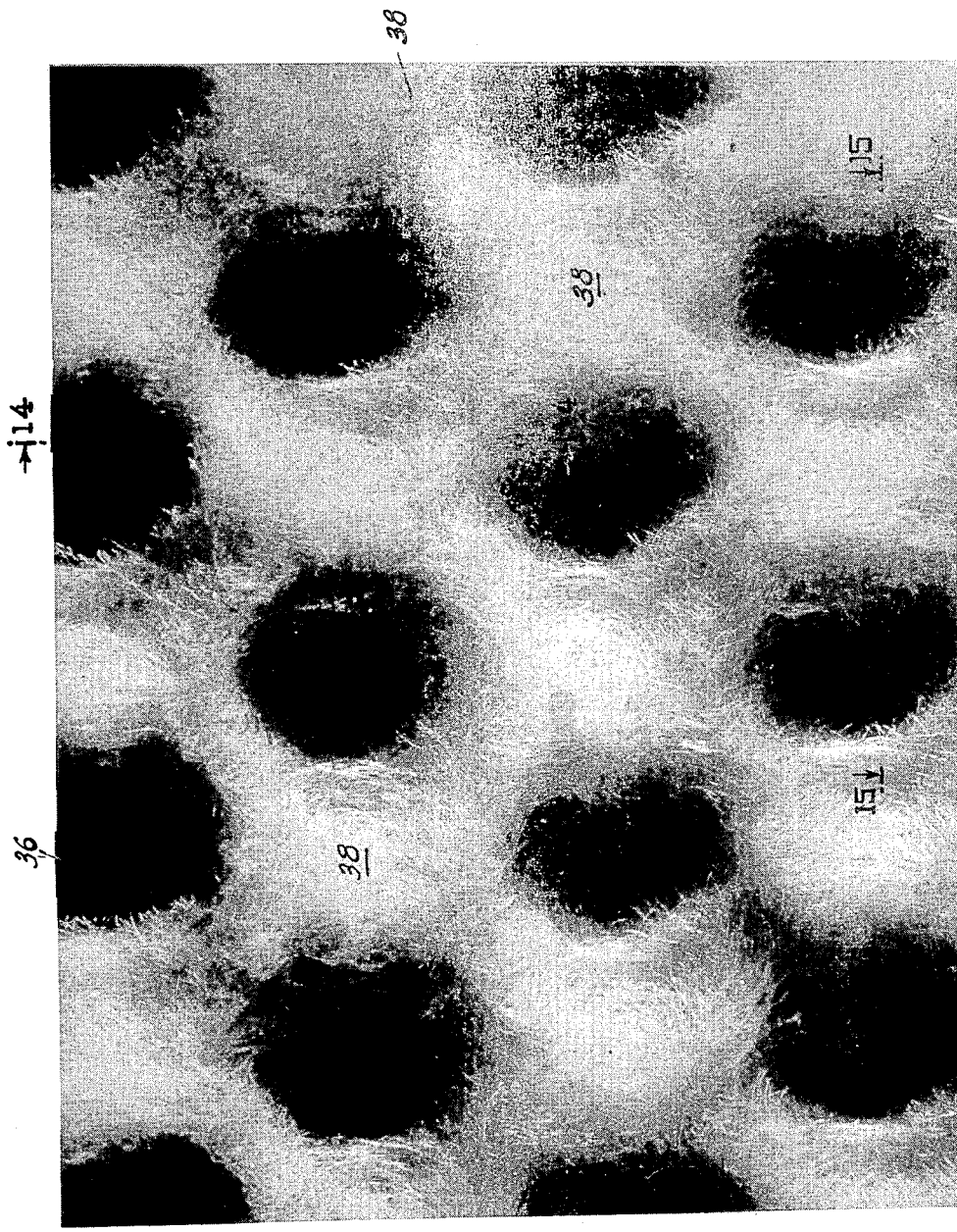
FIG. 13 is a photograph of the tuberculated surface of a nonwoven fabric embodying the present invention, with a magnification of 10×.

The tubercles 38 will vary in thickness from a minimum adjacent the peripheries of the holes 36 in the fabric to a maximum at the crest of the tubercles 38 (FIGS. 10, 11 and 12). Then, too, some of the liquid that has not passed through the pervious support may have its flow impeded by the piled-up heap of fiber segments in its way and this may cause a tendency for the liquid to divide and flow around the protuberances following arrows 39, where the flow from adjacent passageways will combine to facilitate the fiber rearrangement. In a word, there may be eddy currents acting upon the fiber segments but all with a general directional component downstream. The flow of the liquid streams around the protuberances helps to produce fabric portions 40 varying in thickness from hole periphery to where they merge with the tubercle crests and these fabric portions are sometimes referred to herein as tubercle interconnecting portions.

To describe the fabric in still a different way, it may be considered as having been rearranged into a pattern of fabric areas 41 (the area within the dotted line, FIG. 8) whose different area portions containing fibers or fiber segments, have such fibers or fiber segments in different concentration for area portions of the same size but approaching the same fiber density. The area portions of greater concentration (i.e., the tubercles) are thicker than the area portions of lesser concentration (i.e., tubercle interconnecting portions). The thicker area portions in the respective fabric areas are spaced from each other although connected together by the thinner area portions of such fabric areas.

The process of fabric formation just described will compact the fiber segments in all the various regions of the fabric where fibers are present, to a degree greater than had existed in the fiber web before rearrangement, and this despite the disparity in fabric thickness from hole periphery to crest. Insofar as this invention is concerned, the optimum results, if optimum results could always be obtained, would occur when the fiber density throughout the various thicknesses of fabric is substantially the same.

Figure 14:
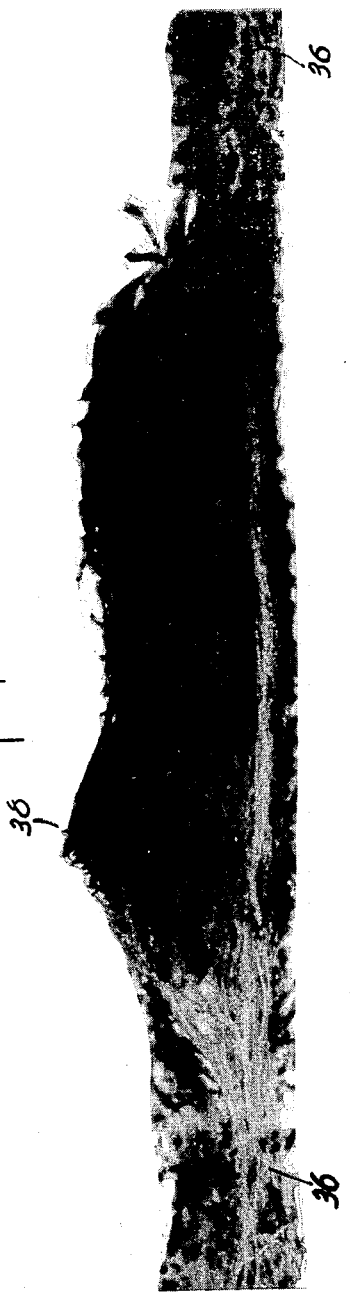
FIG. 14 is a sectional view on line 14—14 of FIG. 13, but with a magnification of 20×.
Figure 15:
FIG. 15 is a photograph of a section on line 15—15 of FIG. 13, but with a magnification of 20×.

The cross-sections through actual fabrics, as presented in FIGS. 14, 15, and 16 are illustrative of the relatively high degree of density uniformity that can be obtained through a practice of the methods of the invention. And this tendency toward uniformity of density will be present even though the eddy current nature of the liquid flow may tend to contribute to a lack of uniformity in the actual arrangement or rearrangement of any given fiber vis-a-vis its neighbor. FIG. 16 is a photograph of a section or very thin slice of fabric taken at right angles to the plane of the fabric at a relatively high degree of magnification. Individual fibers appear in cross-sections taken at various angles with respect to their axes and some fiber segments appear almost parallel to the plane through which the fabric section was taken. This view shows quite clearly and in general a typical approach toward uniformity of density despite variations in fiber concentrations which gives rise to the variations in thickness throughout the fabric's area. True, some irregularities may exist as evidenced by the region 42 where there appears a dearth of fiber segments, brought about perhaps by eddy currents in the rearranging fluid, but, for the most part, the fabric may be thought of as being "solid," i.e., of substantially uniform density throughout its various thicknesses.

Some care must be excercised in selecting the weight of web to be rearranged with reference to the rearranging plate. On the one hand the web selected should not be so light as compared with the coarseness of the rearranging plate selected, as to provide no fibers for piling or heaping against the protuberances or filling up the intaglio cavities in the plate. On the other hand, the web selected should not be so heavy as compared with the fineness of the rearranging plate as to fill up the cavities in the plate without formation of holes. But between these extremes, there are many forming plates of various degrees of fineness or coarseness with each of which a relatively large range of web weights may be rearranged.

Where the starting web has definite fiber orientation, as for instance in a card web having greater strength in the direction of fiber lay, the relationship of plate position to web for greatest efficiency is one where fluid direction along the reference plane is at right angles to fiber lay since fiber dislacement in such a web is easiest at right angles to fiber lay. But the invention may be readily practiced with plate positioned to give fluid direction along the reference plane in alignment with fiber lay or with any intermediate relative positioning of the plate and web depending upon the effect desired.

Furthermore, the invention may be practiced with the forming plate reversed face for face, i.e., by forming the web at the side of the plate presenting the hole openings of greater area, but here the efficiency of fiber rearrangement does not match that with the preferred plate arrangement.

Lastly, if a fabric with tubercles on both faces is desired, one rearranging plate may be used in the preferred manner and another similar rearranging plate substituted for the belt support. In this case it is preferable to use this second plate with its side presenting the protuberances facing inwardly toward the fiber rearranging zone.

Typical of most of the fabric made in accordance with the invention, is the fact that the fibers preparatory to their rearrangement are rendered limp by the action of liquid so as to have no residual tendency to seek their original positions after rearrangement. Under the influence of the fluid the fiber segments are capable not only of relative lateral movement but also of relative longitudinal movement and, regardless of the character of the fiber movement, their ultimate condition in the web will be one of relaxation and mechanical equilibrium. Individual fibers, where the larger fibers are used, will thread throughout the fabric passing a number of different tubercles and tubercle interconnecting portions, but fibers which have segments common to a given tubercle or tubercle interconnecting portion will have other fiber segments in different tubercle or tubercle interconnecting portions which are not common to such fibers. These conditions, of course, repeat themselves countless times throughout the fabric and are responsible in no small measure for the strength of a web made in accordance with the present invention.

Web strength may be augmented by application of binders of acceptable utility for the purpose intended and in any well known manner, as by spraying, printing or immersion.

In the following examples which are illustrative of the invention, the forming plate used was an unrolled "Conidure Plate" illustrated in a pamphlet published by National-Standard Company of Carbondale, Pa., copyright 1960.

The holes are triangular in shape and the hole sizes as given is the diameter of a gauge, around in cross-section, and which will just penetrate the hole.

Example I

A web of loosely assembled fibers obtained by carding and weighing about 800 grains per square yard and with a fiber orientation ratio of approximately 6:1 in the direction of travel, is fed into the fiber-rearranging zone of apparatus as is described hereinbefore. The web comprises 100% viscose rayon fibers approximately 2 inches long and of approximately 1½ denier.

The drum formed from an unrolled Conidure plate has approximately 50 holes per square inch. The holes are triangular in shape, of such size as just to pass a round gauge of .049 inch in diameter, and are arranged in a staggered pattern. The plate has a wall approximately .049 inch thick. Hole angularity is such as to direct the fluid along the reference plane at right angles to the fiber lay. The fluid pervious supporting belt comprises a woven nylon fabric of approximately 40,000 openings per square inch. Water is projected through the holes in the drum, then through the fibrous web, and then through the belt, by nozzles arranged radially inside the drum. The drum is approximately 30 inches in diameter and the nozzles are arranged in four banks and with their outer ends approximately 6 inches from its inside surface. Conventional solid-cone nozzles are used which are capable of delivering approximately 1.4 to 1.6 gallons per minute in sprays whose areas of impingement on the drum overlap, with a water pressure of 80 to 100 pounds per square inch in the manifold. Such water pressure is suitable for use in accordance with the method and apparatus described, to produce the desired streams of water for projection against the drum. At a peripheral drum speed of 50 feet per mintue, an excellent tuberculated fabric is continuously formed After leaving the rearranging zone, the resulting fabric is vacuum dewatered until its moisture content is 150 to 200 percent of the total weight of the fabric, separated from the drum and carried on its supporting belt up over the guide roller after which the web is separated from the carrying belt.

The fabric as thus formed is spray bonded with an acrylic dispersion B–15, essentially ethyl acrylate, as sold by Rohm and Haas, reduced with water to a solids level of approximately 22%. Approximately 200 grains per square yard of binder dispersion is uniformly applied. The fabric is then passed under infrared heaters, partially dried, and then intermittently print bonded with the same acrylic dispersion. The fabric is thereafter can dried and rolled up. The finished fabric weighs approximately 800 grains per square yard, of which approximately 80 grains, or 10% by weight, is resin solids.

This fabric has utility as a point contact surgical dressing.

Example II

A web of loosely assembled fibers obtained by carding, weighing 1200 grains per square yard and with a fiber orientation ratio of approximately 6:1 in the direction of travel, is fed into a rearranging zone of apparatus as is described hereinbefore. The web comprises 50% viscose rayon fibers approximately 2 inches long and 50% bleached cotton fibers averaging about ½ to ¾ inch long, both of approximately 1½ denier.

The drum is equipped with about 23 triangular tapered holes per square inch of approximately 0.069 inch in diameter as measured by the diameter of a gauge, round in cross-section which just penetrates the hole. The holes are arranged in a staggered pattern in the drum which has a wall approximately 0.049 inch thick. The drum is positioned with its protuberances against the fibrous web and with hole angularity such as to direct the fluid along the reference plane at right angles to the fiber lay. The fluid pervious supporting belt is a woven nylon fabric with 40,000 openings per square inch. Water is projected by nozzles arranged radially inside the drum, through the holes in the drum starting at the larger end of the passageways and funneling through the passageways with increasing velocity as it approaches the narrower ends thereof and thence through the fibrous web and the belt. The inside surface of the drum having the larger ends of the passageways is approximately 6 inches from the tips of the spray nozzles. Conventional solid-cone nozzles are used which are capable of delivering approximately 1.4 to 1.6 gallons per minute in sprays whose areas of impingement on the drum overlap, with a water pressure of approximately 80 to 150 pounds per square inch in the manifold. Such water pressure is suitable for use in accordance with the method and apparatus described, to produce the desired streams of water droplets for projection against the drum. With a peripheral drum speed of 50 feet per minute and a velocity of water leaving the nozzles at approximately 100 feet per second, an excellent continuous tuberculated three-dimensional fabric is obtained.

After leaving the rearranging zone, the resulting fabric is dewatered until its moisture content is 150 to 200 percent of the total weight of the fabric.

The dewatered rearranged web and supporting belt then leave the protuberated surface of the drum and pass over the guide roller, at which point they separate. The web is then uniformly sprayed on its tuberculated surface with an acrylic dispersion B–15, essentially ethyl acrylate, as sold by Rohm & Haas, having 22% resin solids as sprayed, to deposit on the rearranged web approximately 100 grains per square yard of resin solids, to impart strength thereto.

This fabric finds utility as a scrubbable wet wipe.

The invention has been described in connection with the preferred embodiment thereof, but many modifications are included within its spirit. It is to be limited, therefore, only by the scope of the appended claims.

What is claimed is:

1. Apparatus for rearranging the fibers in a unitary web of fibrous starting material having individual fibers capable of relative movement within the web under the influence of applied fluid forces, which comprises a member having opposed first and second faces, one of said faces presenting a pattern of protuberances having ends defining a common plane and regions surrounding the individual proturberances recessed inwardly from said plane, side walls in said protuberances, passageways communicating through the side walls of said protuberances interconnecting the second face of said member with the recessed regions of said member, fluid pervious means for supporting a web of such fibrous material in contact with the ends of said protuberances, and means for directing fluid through said passageways from said second face toward said first face at an acute angle with respect to said plane and at velocities such that fiber segments in the web thus supported and in areas thereof opposite the recessed regions of the member are rearranged into a pattern of more closely compacted groups of fiber segments whose contour, in part at least, is determined by the contour of the first face of said member.

2. Apparatus for rearranging the fibers in a unitary web of fibrous starting material having individual fibers capable of relative movement within the web under the influence of applied fluid forces, which comprises a member having opposed first and second faces, one of said faces presenting in a pattern of protuberances having ends defining a common plane and regions surrounding the individual protuberances recessed inwardly from said plane, side walls in said protuberances, passageways through the side walls of the protuberances, said passageways tapering toward said recessed regions and communicating therewith through the side walls of said protuberances and being disposed at an acute angle with respect to said common plane, fluid pervious means for supporting a web of such fibrous material in contact with the ends of said protuberances, and means for directing fluid through said passageways at velocities such that fiber segments in the web thus supported and areas thereof opposite the recessed regions of the member are rearranged into a pattern of more closely compacted groups of fiber segments whose contour, in part at least, is determined by the contour of the first face of said member.

3. Apparatus for rearranging the fibers in a unitary web of fibrous starting material having individual fibers capable of relative movement within the web under the influence of applied fluid forces, which comprises a member having opposed first and second faces, one of said faces presenting a pattern of protuberances having ends defining a common plane and regions surrounding the individual protuberances recessed inwardly from said plane, side walls in said protuberances, passageways through said side walls interconnecting the second face of said member with the recessed regions in the first face of said member and with a portion of the respective passageway walls disposed at an acute angle with respect to said plane, fluid pervious means for supporting a web of such fibrous material in contact with the ends of said protuberances, and means for directing fluid through said passageways from said second face toward said first face at an acute angle with respect to said plane and at velocities such that fiber segments in the web thus supported and in areas thereof opposite the recessed regions of the member are rearranged into a pattern of more closely compacted groups of fiber segments whose contour, in part at least, is determined by the contour of the first face of said member.

References Cited by the Examiner
UNITED STATES PATENTS

| | | | |
|---|---|---|---|
| 1,854,481 | 4/1932 | Mudd | 19—161 |
| 1,882,599 | 10/1932 | Hodshon. | |
| 2,762,433 | 9/1956 | Russell. | |
| 2,862,251 | 12/1958 | Kalwaites | 19—161 |
| 3,025,585 | 3/1962 | Griswold | 19—161 X |
| 3,034,180 | 5/1962 | Greiner et al. | |
| 3,040,412 | 6/1962 | Russell | 28—72 |
| 3,081,501 | 3/1963 | Kalwaites | 19—161 |
| 3,081,512 | 3/1963 | Griswold | 28—72 |
| 3,113,349 | 12/1963 | Nottebohm et al. | 19—161 |

ROBERT R. MACKEY, *Primary Examiner.*
DONALD W. PARKER, *Examiner.*